K. L. HUCKBODY.
DOUBLE SAFETY PIN.
APPLICATION FILED MAY 19, 1917.
1,248,123.
Patented Nov. 27, 1917.
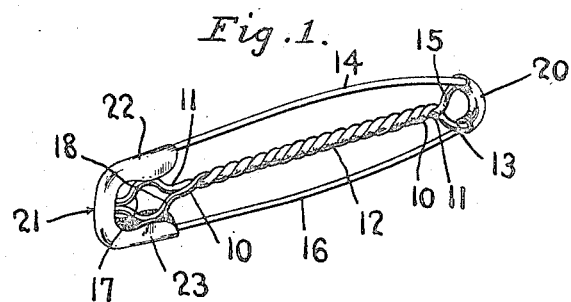
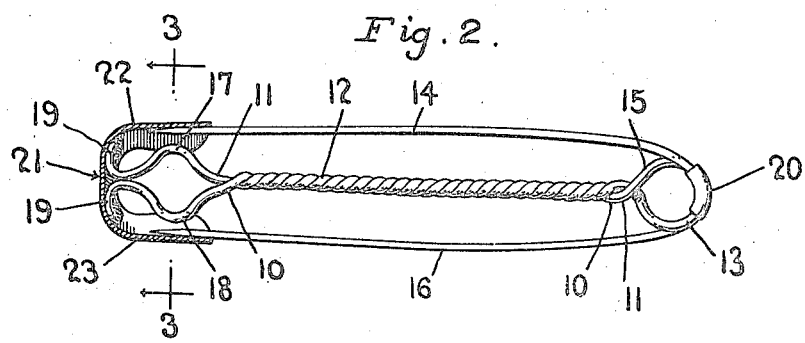
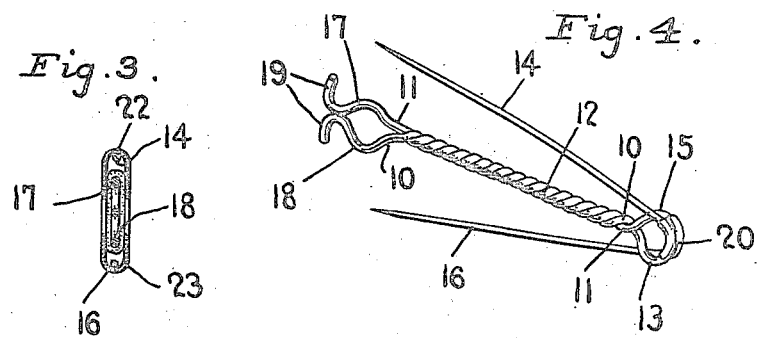
Inventor
K. L. Huckbody,
By
Attorneys

UNITED STATES PATENT OFFICE.

KARL L. HUCKBODY, OF PORTLAND, OREGON.

DOUBLE SAFETY-PIN.

1,248,123.　　　　Specification of Letters Patent.　　Patented Nov. 27, 1917.

Application filed May 19, 1917.　Serial No. 169,758.

*To all whom it may concern:*

Be it known that I, KARL L. HUCKBODY, a citizen of the United States, residing at Portland, in the county of Multnomah and State of Oregon, have invented certain new and useful Improvements in Double Safety-Pins, of which the following is a specification.

This invention relates to an improved double safety pin and has as its primary object to provide a device of this character having complemental pin shanks, either one or both of which may be used as desired.

The invention has as a further object to provide a safety pin wherein the pin shanks will be formed from two lengths of suitable resilient wire twisted together to provide the pin stock arranged between and supporting the said pin shanks.

A further object of the invention is to provide a construction wherein the portions of the lengths of wire forming the pin stock will be bowed to provide keepers for retaining the free ends of the pin shanks in engagement with the guard of the pin.

And the invention has a still further object to provide a safety pin which shall be of simple construction and capable of manufacture at minimum cost.

Other and incidental objects will appear as the description proceeds and in the drawings wherein I have illustrated the preferred embodiment of the invention and wherein similar reference characters designate corresponding parts throughout the several views:

Figure 1 is a perspective view of my improved safety pin showing the pin shanks engaged within the guard of the pin, Fig. 2 is a side elevation partly in section and more particularly showing the mounting of the pin guard, Fig. 3 is a sectional view taken on the line 3—3 of Fig. 2 and looking in the direction of the arrows this view particularly showing the arrangement of the keepers of the pin stock with respect to the arms of the guard of the pin for normally retaining the pin shanks in engagement with the said guard, and Fig. 4 is a detail perspective view of the pin with the guard detached this view particularly showing the manner in which the stock of the pin is formed.

In carrying out the invention, I employ two lengths 10 and 11 respectively, of suitable resilient wire which, intermediate the ends thereof, are twisted together to form the pin stock 12. At the outer extremity of this stock the length of wire 10 is bent to provide a spring loop 13 and from the said loop is thence extended to form a pin shank 14 projecting toward the inner end of the stock and pointed at its free end with the loop 13 yieldably urging the free extremity of the said shank away from the stock. At the outer extremity of the pin stock, the wire 11 is bent to form a spring loop 15 similar to the loop 13 of the wire 10. The loop 15 is arranged to overlie the loop 13 and from the loop 15 the wire 11 is thence extended to form a pin shank 16 projecting toward the inner extremity of the pin stock at the side thereof opposite the pin shank 14 and similar thereto with the loop 15 normally urging the free extremity of the shank 16 away from the pin stock.

At the inner extremity of the pin stock 12 the wires 10 and 11 are bowed laterally in opposite directions to provide keepers 17 and 18 respectively when the adjacent extremities of the said lengths of wire are again brought together to abut each other and are then again bent laterally in opposite directions to form lateral oppositely disposed lugs 19. Connecting the spring loops 13 and 15 of the pin shanks at the outer sides of the said loops is a metallic clip 20 bent around the said loops for holding the said loops together. As will now be seen, the pin stock and the complemental pin shanks carried thereby, in being constructed of two lengths of material, bent into proper shape, may be readily formed at one operation.

Connected with the inner extremity of the pin stock 12 is a suitable U-shaped channeled guard 21 having confronting arms 22 and 23 respectively. This guard is preferably formed from a single piece of suitable sheet metal bent into proper shape and is fitted over the lugs 19 at the inner end of the pin shank. The lugs seat within the bight portion of the said guard with the arms 22 and 23 of the guard projecting over the keepers 17 and 18 of the pin shank 12. The guard is connected to the lugs 19 of the pin shank by a binder of solder or in any other preferred manner and as will now be best observed upon reference to Fig. 3 of the drawings, the keepers 17 and 18 are arranged to project into the channels of the arms 22 and 23 of the guard between the sides thereof. The free extremities of the pin shanks 14 and 16 may thus be deflected inwardly toward the pin shank 12 against the tension of the spring loops 13 and 15 of the said pin shanks to seat the free ends of the said shanks against the keepers 17 and 18 when the said keepers will act to direct the outer pointed terminals of the said pin shanks into the said arms under the tension of the said spring loops. The free extremities of the pin shanks may thus be readily engaged within the arms of the guard which will, as illustrated in Fig. 2 of the drawings, act to hold the pin shanks closed and in this connection, particular attention is directed to the fact that since the keepers 17 and 18 project between the sides of the said arms these keepers will tend to prevent accidental displacement of the said pin shanks.

It will therefore be seen that I provide a particularly simple construction for the purposes set forth and since either of the pin shanks of the device may be operated one independently of the other, either one of the pin shanks may be engaged with the work or both of the said pin shanks may be simultaneously engaged with the work. I therefore provide a very desirable and efficient type of safety pin.

Having thus described the invention, what is claimed as new is:

1. A safety pin formed of overlapping strands of material twisted together to provide a pin stock and oppositely bowed longitudinally of the stock at one extremity thereof to form opposed keepers extending laterally from the stock, the said lengths of material at the opposite extremity of the stock being extended in opposite directions to provide complemental pin shanks disposed at opposite sides of the stock, and a channel-shaped guard connected to the extremity of the pin stock adjacent said keepers and having the keepers extending longitudinally between the sides thereof to coöperate with the pin shanks for normally retaining the said shanks engaged with the guard.

2. A safety pin formed of overlapping strands of material twisted together to provide a stock and thence bowed in opposite directions at one extremity of the stock to form overlapping spring loops, the adjacent extremities of the said strands extending from the said loops to form pin shanks disposed at opposite sides of the stock, a clip connecting the said spring loops and securing the said loops one upon the other, and a guard mounted upon the opposite extremity of the stock and adapted to receive the free ends of said pin shanks.

3. A safety pin formed of coacting lengths of material twisted together to provide a stock and thence extended at one extremity of the stock to form pin shanks extending at opposite sides of the stock, the said lengths of material at the opposite extremity of the stock being bowed in opposite directions to form opposed lateral keepers and thence having the adjacent free ends thereof curved away from each other, and a guard mounted upon the terminal of the stock adjacent said keepers and fitted over the curved ends of the said lengths of material, the said guard being secured to the said curved ends for connecting the said ends and rigidly supporting the keepers to coöperate with the guard for normally retaining the pin shanks engaged with the guard.

In testimony whereof I affix my signature.

KARL L. HUCKBODY. [L. S.]